United States Patent [19]

Sommer

[11] Patent Number: 5,010,975
[45] Date of Patent: Apr. 30, 1991

[54] MOTOR VEHICLE COMPRISING TWO DRIVEN AXLES

[75] Inventor: Hans D. Sommer, Graz, Austria

[73] Assignee: Steyr-Daimler-Puch AG, Vienna, Austria

[21] Appl. No.: 436,067

[22] Filed: Nov. 13, 1989

[30] Foreign Application Priority Data

Dec. 21, 1988 [AT] Austria .................................. 3119/88

[51] Int. Cl.$^5$ ............................................. B60K 17/35
[52] U.S. Cl. ..................................... 180/248; 180/249
[58] Field of Search ................ 180/147, 148, 149, 150

[56] References Cited

U.S. PATENT DOCUMENTS

| | | | |
|---|---|---|---|
| 4,592,442 | 6/1986 | Wilson | 180/247 |
| 4,723,624 | 2/1988 | Kawasaki et al. | 180/233 |
| 4,854,413 | 8/1989 | Kameda et al. | 180/248 X |

FOREIGN PATENT DOCUMENTS

| | | |
|---|---|---|
| 0149302 | 7/1985 | European Pat. Off. |
| 3317247 | 2/1988 | Fed. Rep. of Germany |
| 63-90438 | 4/1988 | Japan ............................ 180/249 |
| 2189753A | 11/1987 | United Kingdom |
| 2192159A | 1/1988 | United Kingdom |

*Primary Examiner*—Charles A. Marmor
*Assistant Examiner*—Victor E. Johnson
*Attorney, Agent, or Firm*—Marmorek, Guttman & Rubenstein

[57] ABSTRACT

A motor vehicle comprises two driven axles, one of which is adapted to be driven by a drive train, which comprises a liquid friction coupling, which is preceded in said drive train by a clutch, which is adapted in a first position to cause the rear axle to be driven via said liquid friction coupling, in a second position to by-pass said liquid friction coupling and in a third position to disconnect said rear axle from said drive train. In a motor vehicle comprising a transmission comprising at least one cross-country or crawling gear the clutch is adapted to assume said second position under the control of a pick-up, which is associated with the cross-country gear or gears, a switching and control stage, and an actuator in response to the selection of the cross-country gear or one of the cross-country gears. That actuation is independent of the position previously assumed by the clutch. The clutch will remain in that position until a road gear is selected in the transmission. That arrangement will ensure that proper conditions for the drive of the axle which is driven via the coupling unit consisting of the liquid friction coupling and the clutch will be obtained during the cross-country travel regardless of the experience and skill of the driver.

6 Claims, 2 Drawing Sheets

MOTOR VEHICLE COMPRISING TWO DRIVEN AXLES

BACKGROUND OF THE INVENTION

1. Field of the Invention

This invention relates to a motor vehicle comprising two driven axles, one of which is adapted to be driven by a drive train, which comprises a liquid friction coupling, which is preceded in said drive train by a clutch, which is adapted in a first position to cause the rear axle to be driven via said liquid friction coupling, in a second position to by-pass said liquid friction coupling and in a third position to disconnect said rear axle from said drive train.

2. Description of the Prior Art

Such a motor vehicle is already known from EP-A-O 149 302 and comprises an automatic transmission which is optionally also manually operable and does not have a special cross-country or crawling gear. The front axle is constantly driven. The coupling unit which is contained in the drive train leading to the rear axle and consisting of the liquid friction coupling and the preceding clutch must manually be operated and there is no automatic device for controlling that coupling unit in dependence on the conditions of travel. Whereas it has been stated that it is desirable to provide for a direct drive of the rear axle, i.e., for a by-passing of the liquid friction coupling, during a travel on poor roads or during cross-country travel, this is left to the skill of the driver so that difficulties may arise during travel. When the rear axle is driven via the liquid friction coupling during a travel in loose sand or deep snow, a high slip will occur at the constantly driven front axle so that the front wheels will tend to dig into the ground and will not exhibit an optimum traction behavior. Besides, the lateral force acting on the spinning wheels will greatly be reduced. Moreover, there will be a large speed difference between the halves of the liquid friction coupling under such conditions of travel so that said coupling will be subjected to high stresses. Said circumstances will obviously be particulary significant in a motor vehicle having a transmission which comprises a leat one cross-country or crawling gear because the motor vehicle is intended for prolonged cross-country travel.

SUMMARY OF THE INVENTION

It is an object of the invention so to improve the motor vehicle described first hereinbefore that proper conditions for the drive of the axle which is driven via the coupling unit consisting of the liquid friction coupling and the clutch will be ensured during cross-country travel regardless of the experience and skill of the driver.

That object is accomplished in accordance with the invention in that in a motor vehicle comprising a transmission comprising at least one cross-country or crawling gear the clutch is adapted to assume said second position under the control of a pick-up, which is associated with the cross-country gear or gears, a switching and control stage, and an actuator in response to the selection of the cross-country gear or one of the cross-country gears and is adapted to remain in that position until a road gear is selected in the transmission.

As a result, the selection of the or one cross-country gear will cause the liquid friction coupling to be by-passed so that the associated axle will than rigidly or directly be driven, a digging of the wheels of the constantly driven axle will be avoided and the liquid friction coupling will be protected from excessively high stresses. A braking will not have the result that the axle which is otherwise driven via the liquid friction coupling is disconnected from the drive whereas during road travel above a predetermined speed limit the drive train must automatically be disconnected if the stability of the vehicle is to be maintained during braking.

DETAILED DESCRIPTION OF THE PREFERRED EMBODIMENTS

Figure 1:
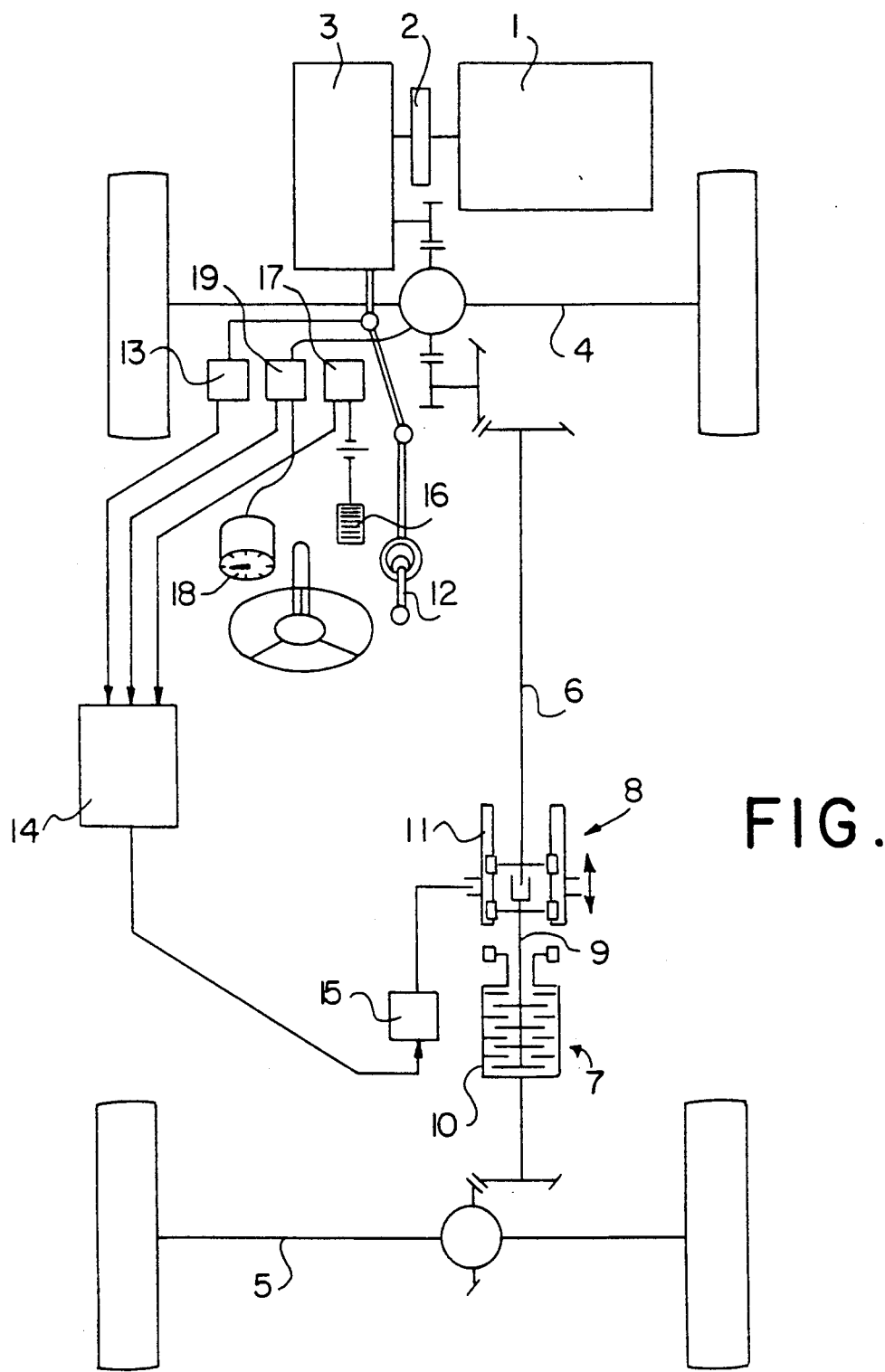
FIG. 1 is a diagrammatic view showing as an illustrative embodiment the essential parts of the drive system of a motor vehicle as well as a switching and control stage.

An engine 1 constantly drives the front axle 4 of the motor vehicle via a traction clutch 2 and a transmission 3, which comprises at least one cross-country or crawling gear. A drive train 6 leads from the transmission 3 to the rear axle 5 and includes a liquid friction coupling, such as a Visco coupling 7, which is preceded by a clutch 8, which is operable to interrupt the drive train 6. Behind the clutch 8 the drive train 6 is continued by the input shaft 9 of the liquid friction coupling 7. The housing 10 of that coupling is connected to the rear axle 5 to drive the latter. In front of the interruption, the drive train 6 comprises clutch dogs. The input shaft 9 of the liquid friction coupling 7 and the housing 10 of that coupling are also provided with such clutch dogs. A sliding sleeve 11 is provided, which cooperates with the dogs.

When the sliding sleeve 11 is in the illustrated (first) position, the drive train 6 and the shaft 9 are non-rotatably interconnected so that the rear axle 5 is driven via the liquid friction coupling 7. When the sliding sleeve 11 is disengaged from the dogs of the shaft 9 by being displaced upwardly in the drawing to a third position, the rear axle 5 will be entirely disconnected from the transmission 3. Upon a displacement of the sliding sleeve 11 toward the housing 10 of the liquid friction coupling 7 the clutch 8 will be in a second position and the housing 10 will directly be connected to the drive train 6 so that the rear axle 5 will directly be driven.

When the gearshift lever 12 is operated to select the or one cross-country gear of the transmission 3, that operation will be detected by a pick-up 13, which will deliver a corresponding signal to a switching and control stage 14, which will be described hereinafter and will then cause an actuator 15 for the clutch 8 to be hydraulically, pneumatically or electircally operated to move the sliding sleeve 11 to the second position, in which it by-passes the liquid friction coupling 7. That position will be maintained as long as a cross-country or crawling gear of the transmission is engaged. Under such operating conditions a braking will not result in an interruption of the drive train. Upon a selection of a road gear of the transmission 3 the sliding sleeve 11 is returned, in the manner to be described hereinafter, to its illustrated second first position, in which the rear axle 5 is driven via the liquid friction coupling 7.

When the speed of the vehicle exceeds a predetermined limit and the brake pedal 16 is depressed, the pick-up 17, the switching and control stage 14 and the actuator 15 will be operated to displace the sliding sleeve 11 to the third position, in which the drive train 6 is interrupted. Such a rise of the speed of travel above said limit will be detected by a further pick-up 19, which is associated with the tachometer 18 and will then deliver a corresponding signal to the switching and control stage 14.

Figure 2:
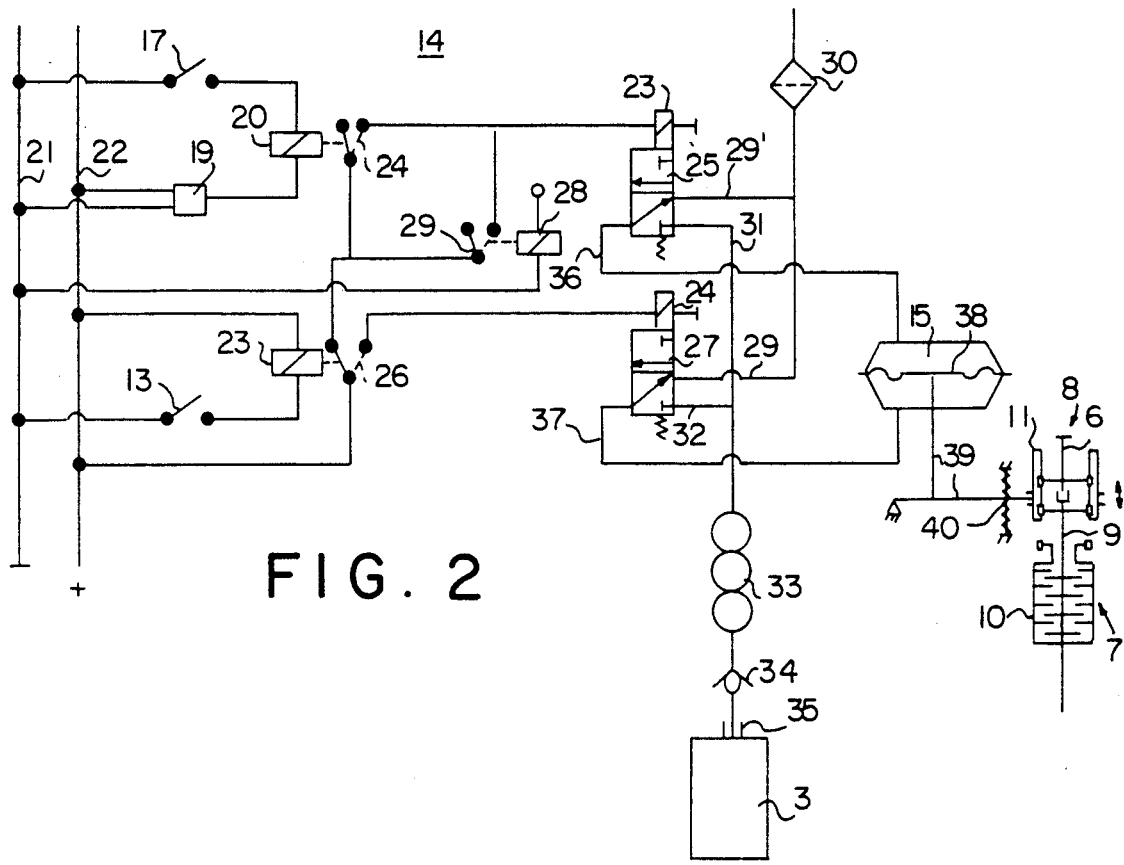
FIG. 2 is a circuit diagram of the switching and control stage of FIG. 1.

In accordance with FIG. 2 the switching and control stage 14 for controlling the actuator 15 comprises a relay 20, which is connected to a ground lead 21 by the pick-up 17, which consists of a switch. The relay 20 is connected to a feed line 22 by the pick-up 19, which consists of a threshold value switch. The pick-up 19 is also connected to the ground lead 21. Another relay 23 is connected to the feed line 22 and is also connected to the ground lead 21 by the pick-up 13, which consists of a switch. The contact 24 which is controlled by the relay 20 is a make contact. A control line of a relay 23 associated with a three-way valve 25 is connected to the feed line 22. That control line includes the contact 26, which is controlled by the relay 23 and consists of a change-over contact, which in its second position causes a relay 24, which is associated with another three-way valve 27 and has a ground terminal, to be connected to the feed line. A relay 28 is connected to the ground lead 21 and will be connected to a feed line, not shown, only when the engine is running. The contact controlled by the relay 28 is connected in parallel to the contact 24. The two three-way valves are connected to the atmosphere via pneumatic lines 29 and 29' and a filter 30 and are connected to the intake pipe 35 of the engine 1 via pneumatic lines 31, 32, a vacuum vessel 33 and a non-return valve 34. Pneumatic lines 36 and 37 are connected to the valves 25 and 27, respectively, and are connected above and below the diaphragm 38 to the actuator 15, which consists of a vacuum-operated box and is connected by an actuating linkage 39 to the sliding sleeve 11 of the clutch 8.

That switching and control stage 14 has the following mode of operation.

Upon a selection of the or one cross-country gear, the switch 13 is closed so that the relay 23 operates and its contact 26 closes the circuit for the relay 24. As a result, the three-way valve 27 connects the line 37 to the vacuum vessel 33 so that a vacuum is applied in the vacuum-operable actuator 15 to the chamber below the diaphragm 38 and the actuating linkage 39 displaces the sliding sleeve 11 of the clutch 8 against the force of a spring 40 to the second position, in which the liquid friction coupling 7 is by-passed. Upon a selection of a road gear, the switch 13 is opened and the relay 23 and, as a result, the relay 24 drop out so that the three-way valve 27 now connects the line 37 to the line 29 to apply atmospheric pressure to the chamber below the diaphragm 38 in the vacuum-operable actuator 15. The spring 40 will now displace the sliding sleeve 11 to the first position, which is shown in FIG. 1 and in which the rear axle 5 is driven via the liquid friction coupling 7.

Upon an actuation of the brake pedal 16, the switch 17 is closed. Upon a rise of the speed of the vehicle above a predetermined limit, the threshold value switch 19 is closed too so that the relay 20 operates and by its contact 24 closes the circuit of the relay 23 of the three-way valve 25. The latter is now shifted to a position in which the line 36 is connected to the line 31 connected to the vacuum vessel 33. As a result, a vacuum is applied in the vacuum-operable actuator 15 to the chamber above the diaphragm 38 and the actuating linkage 39 is now operated to displace against the force of a spring 40 the sliding sleeve 11 to the third position, in which the drive train 6 is interrupted.

When the actuation of the brake pedal 16 is discontinued or when the speed of travel of the vehicle decreases below the predetermied limit, the switch 17 and/or the threshold value switch 19 will open so that the two relays 20, 23 drop out. As a result, the three-way valve 25 is shifted to a position in which line 36 is connected to line 29' and atmospheric pressure is applied in the vacuum-operable actuator 15 to the chamber above the diaphragm 38. The spring 40 now displaces the sliding sleeve 11 back to the illustrated first position, in which the rear axle 5 is driven via the liquid friction coupling 7.

During a standstill of the engine of the vehicle the sliding sleeve 11 should not move to the first position, in which the rear axle is driven via the liquid friction coupling 7 because this would, e.g., prevent a towing of the vehicle on two wheels. In order to prevent a movement of the sliding sleeve 11 to that first position when the engine is at a standstill, the relay 28 is de-energized and drops out to close its contact 29 when the engine is at a standstill so that the contact 24 of the relay 20 will be bridged and the relay 23 will operate. As a result, the sliding sleeve is held in the manner described hereinbefore in the third position, in which the drive train 6 is interrupted.

Figure 3:
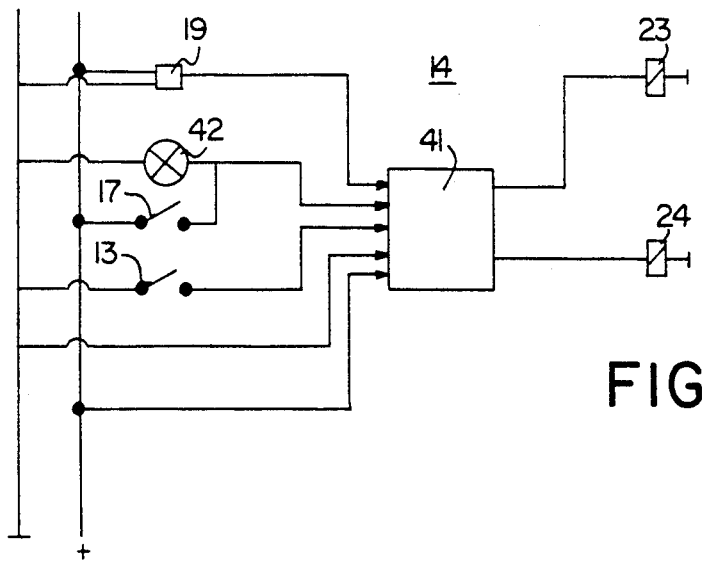
FIG. 3 shows a modification of the switching and control stage of FIG. 2.

In accordance with FIG. 3 the relays 20, 23 and 28 and the associated contacts 24, 26 and 29 have been replaced by an electronic control unit 41, which on its input side receives control signals in response to the closing of the switches or pick-ups 13, 17, 19 and delivers said control signals via the two output control lines to the two relays 23 and 24 of the three-way valves 25 and 27. This results in displacements of the sliding sleeve 11 as described with reference to FIG. 2. A stop light of the vehicle is designated 42. All other components of the circuit correspond to the similar components in FIG. 2 and are designated by the same reference characters.

I claim:
1. A motor vehicle comprising
first and second driven axles,
a transmission for driving said first and second driven axles, said transmission including at least one selectively engageable road gear and a selectively engageable cross-country gear,
a drive train operatively connecting said transmission to said second driven axle, said drive train including a liquid friction coupling and a clutch preceding said liquid friction coupling, said clutch being operative between a first position in which said second driven axle is connected to said transmission via said clutch and said liquid friction coupling, a second position in which said second driven axle is connected directly to said transmission via said clutch, and a third position in which said second driven axle is disconnected from said transmission,
first pick-up means for detecting which of said cross-country gear and said road gear is selected,
second pick-up means for detecting the speed of said vehicle, third pick-up means for detecting when a brake is actuated, and automatic switching and control means responsive to said first, second, and third pick-up means for automatically shifting said clutch into said first position when said road gear is selected, into said second position when said cross-country gear is selected, and into said third position when the speed of said vehicle is above a threshold value and said brake is actuated.

2. The motor vehicle of claim 2 wherein said automatic switching and control means comprises an actuator and a linkage for shifting said clutch into said first, second, and third positions.

3. The motor vehicle of claim 2 wherein said actuator comprises a vacuum chamber and a diaphragm within said vacuum chamber, said linkage being connected to said diaphragm.

4. The motor vehicle of claim 3 wherein said automatic switching and control means further comprises first and second valve means connected to said vacuum chamber on opposite sides of said diaphragm for displacing said diaphragm in opposite directions.

5. The motor vehicle of claim 4 wherein said first valve means is responsive to said first pick-up means and said second valve means is responsive to said second and third pick-up means.

6. The motor vehicle of claim 5 wherein each of said first and second valve means comprises a three-way valve.

* * * * *